(12) United States Patent
Kuroyanagi

(10) Patent No.: US 9,015,628 B2
(45) Date of Patent: Apr. 21, 2015

(54) IMAGE FORMING APPARATUS AND SCREEN CONTROL METHOD THAT DISPLAYS A LIST SCREEN

(75) Inventor: Tomohiro Kuroyanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 856 days.

(21) Appl. No.: 13/182,035

(22) Filed: Jul. 13, 2011

(65) Prior Publication Data

US 2012/0023451 A1    Jan. 26, 2012

(30) Foreign Application Priority Data

Jul. 22, 2010   (JP) ................... 2010-165261

(51) Int. Cl.
  *G06F 3/048*   (2013.01)
  *G06F 9/445*   (2006.01)
  *G06F 9/44*    (2006.01)

(52) U.S. Cl.
  CPC .. *G06F 8/60* (2013.01); *G06F 8/38* (2013.01); *G06F 9/4443* (2013.01)

(58) Field of Classification Search
  CPC ............... G06F 8/60; G06F 8/38; G06F 8/34; G06F 9/4443; G06F 3/0481; G06F 3/04817; G06F 3/0482
  USPC .......................... 715/835, 763, 810, 847, 762
  See application file for complete search history.

(56) References Cited

U.S. PATENT DOCUMENTS 5,592,605 A *  1/1997 Asuma et al. ................. 715/775
8,345,271 B2 * 1/2013 Mori ............................ 358/1.13

2004/0057074 A1   3/2004 Ohishi et al.
2007/0008573 A1   1/2007 Yamada (Continued)

FOREIGN PATENT DOCUMENTS

EP           1 387 566 A1    2/2004
JP         A2007-049677      2/2007

(Continued)

OTHER PUBLICATIONS

Japanese Office Action issued Dec. 3, 2013 in Patent Application No. 2010-165261.

(Continued)

*Primary Examiner* — Weilun Lo
*Assistant Examiner* — Rashedul Hassan
(74) *Attorney, Agent, or Firm* — Oblon, McClelland, Maier & Neustadt, L.L.P.

(57) ABSTRACT

An image forming apparatus includes an arrangement information memory to store icon arrangement information in which entries respectively corresponding to standard applications and extension applications are provided, and in which application identification information identifying an application in each entry is associated with information about icon coordinates and information about an icon image, a list-screen generating unit to generate, based on the icon arrangement information, an application list screen in which icons corresponding to the standard applications and the extension applications are displayed, a display unit to display the generated application list screen, an input unit to detect pressing of an icon in the displayed application list screen, and a screen control unit to identify a standard or an extension application corresponding to the pressed icon based on the icon arrangement information and to request the identified application to generate an operation screen, wherein the display unit displays the operation screen.

14 Claims, 16 Drawing Sheets

(56) References Cited

U.S. PATENT DOCUMENTS

| | | |
|---|---|---|
| 2007/0008583 A1 | 1/2007 | Araki |
| 2007/0180236 A1* | 8/2007 | Kuroyanagi et al. ......... 713/162 |
| 2007/0273911 A1 | 11/2007 | Nakajima |
| 2009/0046057 A1 | 2/2009 | Umezawa |
| 2009/0183116 A1* | 7/2009 | Murata et al. ................. 715/810 |
| 2009/0237699 A1* | 9/2009 | Umezawa .................... 358/1.13 |
| 2010/0107152 A1 | 4/2010 | Kwon |
| 2010/0122187 A1 | 5/2010 | Kunori et al. |

FOREIGN PATENT DOCUMENTS

| | | |
|---|---|---|
| JP | A2009-070365 | 4/2009 |
| JP | 2009-260903 A | 11/2009 |
| JP | A2010-114825 | 5/2010 |

OTHER PUBLICATIONS

Extended European Search Report issued on Nov. 22, 2011 in patent application No. 1 172180.9.

\* cited by examiner

FIG.3
| ICON ID | ICON IMAGE DATA |
|---------|-----------------|
| ID0001  |  |
| ID0002  |  |
| ID0003  |  |
| ...     | ...             |
| ID1011  |  |

FIG.4

| ARRANGEMENT ID | COORDINATE | ICON ID | DISPLAY SCREEN OWNER ID | SETTING NUMBER | URL NUMBER |
|---|---|---|---|---|---|
| 001 | (10,200) | ID0001 | 0001 (COPY APPLICATION) | — | — |
| 002 | (190,200) | ID0002 | 0002 (SCANNER APPLICATION) | — | — |
| 003 | (370,200) | ID0003 | 0003 (PRINTER APPLICATION) | — | — |
| 004 | (550,200) | ID0004 | 1001 (typeC:SDK COPY APPLICATION) | 3 | — |
| 005 | (730,200) | ID0005 | 1001 (typeC:SDK COPY APPLICATION) | 1 | — |
| 006 | (10,300) | ID0103 | 2001 (typeJ:SDK EASY SCANNER APPLICATION) | 2 | — |
| 007 | (190,300) | ID0104 | 0001 (COPY APPLICATION) | 3 | — |
| 008 | (370,300) | ID0104 | 0001 (COPY APPLICATION) | — | — |
| 009 | (550,300) | ID1011 | 0050 (WEB BROWSER) | — | 1 |
| 010 | (730,300) | ID1011 | 0050 (WEB BROWSER) | — | 2 |
| ... | ... | ... | ... | ... | ... |

FIG.5

| SETTING NUMBER | REGISTRATION NAME | SETTINGS ||||||||
|---|---|---|---|---|---|---|---|---|---|
| | | COLOR | PAPER-FEED TRAY | DOCUMENT TYPE | SET DIRECTION | DENSITY | DUPLEX /COMBINE /SERIES | REDUCE /ENLARGE | FINISHING |
| 1 | COMBINED-PRINTING | FULL COLOR | A4 LANDSCAPE | PHOTO | READABLE DIRECTION | NORMAL | COMBINED | 71% | SORT |
| 2 | BLACK&WHITE COPY | BLACK &WHITE | A3 PORTRAIT | COPY DOCUMENT | UNREADABLE DIRECTION | NORMAL | — | — | SORT |
| 3 | DUPLEX A4 COPY | FULL COLOR | A4 LANDSCAPE | COPY DOCUMENT | READABLE DIRECTION | NORMAL | DUPLEX | — | STAPLE |
| . . . | | | | | | | | | |
| 9 | <UNREGISTERED> | — | — | — | — | — | — | — | — |
| 10 | <UNREGISTERED> | — | — | — | — | — | — | — | — |

FIG.6

| URL NUMBER | REGISTRATION NAME | URL |
|---|---|---|
| 1 | AAA HOMEPAGE | http://www.AAA.co.jp/ |
| 2 | BBB HOMEPAGE | http://www.BBB.co.jp/ |
| ... | ... | ... |
| 9 | <UNREGISTERED> | - |
| 10 | <UNREGISTERED> | - |

FIG.12A

10-ICON PATTERN

| ARRANGEMENT ID | COORDINATE |
|---|---|
| 001 | (10,200) |
| 002 | (190,200) |
| 003 | (370,200) |
| 004 | (550,200) |
| 005 | (730,200) |
| 006 | (10,300) |
| 007 | (190,300) |
| 008 | (370,300) |
| 009 | (550,300) |
| 010 | (730,300) |
| 011 | (10,200) |
| 012 | (190,200) |
| 013 | (370,200) |
| ... | ... |

FIG.12B

15-ICON PATTERN

| ARRANGEMENT ID | COORDINATE |
|---|---|
| 001 | (10,120) |
| 002 | (190,120) |
| 003 | (370,120) |
| 004 | (550,120) |
| 005 | (730,120) |
| 006 | (10,220) |
| 007 | (190,220) |
| 008 | (370,220) |
| 009 | (550,220) |
| 010 | (730,220) |
| 011 | (10,320) |
| 012 | (190,320) |
| 013 | (370,320) |
| ... | ... |

FIG.16

| USER ID | TABLE ID |
|---|---|
| U_301 | T_101 |
| U_302 | T_102 |
| U_303 | T_103 |
| U_304 | T_104 |
| U_305 | T_105 |
| U_306 | T_106 |
| ... | ... |

IMAGE FORMING APPARATUS AND SCREEN CONTROL METHOD THAT DISPLAYS A LIST SCREEN

CROSS-REFERENCE TO RELATED APPLICATIONS

The present application is based on Japanese priority application No. 2010-165261 filed on Jul. 22, 2010, with the Japanese Patent Office, the entire contents of which are hereby incorporated by reference.

BACKGROUND OF THE INVENTION

1. Field of the Invention

The disclosures herein relate to an image forming apparatus and a screen control method.

2. Description of the Related Art

With the current development of multi-functionality, multifunctional machines are provided with not only standard applications (i.e., copy, scanner, FAX, printer), but also additional functions such as a Web-page browse function and applications added by third-party vendors using a software development kit (hereinafter referred to as an SDK). Multifunctional machines are also provided with macro functions that allow pre-stored settings (e.g., A4 size, black and white copying, combined copying, staple) to be retrieved for an application (e.g., for a copy application).

Such multifunctional machines with enhanced multi-functionality may require an increased number of user operation steps when using an application or a macro function that is later added. In consideration of this, Japanese Patent Application Publication No. 2010-114825 discloses registering installed application functions and pre-stored settings (macros), thereby allowing the registered information to be readily retrieved.

Such a related-art configuration, however, does not take into account applications that are added as extensions by an SDK having a different system configuration. Also, macros need to be registered in a portal application in advance. Namely, from the viewpoint of user operability, this related-art configuration is not yet ready to be applied to a multifunctional machine with enhanced multi-functionality. In order to display an SDK-application screen, in particular, there may be a need to display a list of SDK applications first, followed by allowing a choice of a desired application to be made, and then displaying the operation screen of the selected application.

Accordingly, it may be desired to provide an image forming apparatus and a screen control method that can improve user operability for a multifunctional machine with enhanced multi-functionality.

SUMMARY OF THE INVENTION

It is a general object of at least one embodiment disclosed herein to provide an image forming apparatus and a screen control method that substantially obviate one or more problems caused by the limitations and disadvantages of the related art.

In one embodiment, an image forming apparatus includes an arrangement information memory configured to store icon arrangement information in which entries respectively corresponding to one or more pre-stored standard applications and in which one or more additionally installed extension applications are provided, and application identification information for identifying an application in each entry is associated with information about icon coordinates and information about an icon image, a list-screen generating unit configured to generate, based on the icon arrangement information, an application list screen in which icons corresponding to the one or more standard applications and the one or more extension applications are displayed, a display configured to display the generated application list screen, an input unit configured to detect pressing of an icon in the displayed application list screen, and a screen control unit configured to identify a standard application or an extension application corresponding to the pressed icon based on the icon arrangement information and to request the identified standard application or the identified extension application to generate an operation screen, wherein the display displays the operation screen generated in response to the request.

According to one embodiment, a method of controlling screens in an image forming apparatus in which one or more pre-stored standard applications are provided, and in which one or more extension applications are additionally installable, includes the steps of generating an application list screen in which icons corresponding to the one or more standard applications and one or more extension applications are displayed, the application list screen being generated based on icon arrangement information in which application identification information identifying the one or more standard applications and the one or more extension applications is associated with information about icon coordinates and information about icon images, displaying the generated application list screen, detecting pressing of an icon in the displayed application list screen, identifying a standard application or an extension application corresponding to the pressed icon based on the icon arrangement information to request the identified standard application or the identified extension application to generate an operation screen, generating the operation screen by use of the identified standard application or the identified extension application, and displaying the generated operation screen.

According to at least one embodiment, user operability is improved with respect to the multifunctional machine with enhanced multi-functionality.

BRIEF DESCRIPTION OF THE DRAWINGS

Other objects and further features of embodiments will be apparent from the following detailed description when read in conjunction with the accompanying drawings, in which:

FIG. 3 is a drawing illustrating an example of icon image information;

FIG. 4 is a drawing illustrating an example of icon arrangement information;

FIG. 5 is a drawing illustrating an example of settings for a copy application;

FIG. 6 is a drawing illustrating an example of URL information;

FIGS. 12A and 12B are drawings illustrating examples of icon coordinate information;

FIG. 16 is a drawing illustrating an example of user screen information.

DESCRIPTION OF THE PREFERRED EMBODIMENTS

In the following, embodiments will be described with reference to the accompanying drawings.

[First Embodiment]

<Hardware>

Figure 1:
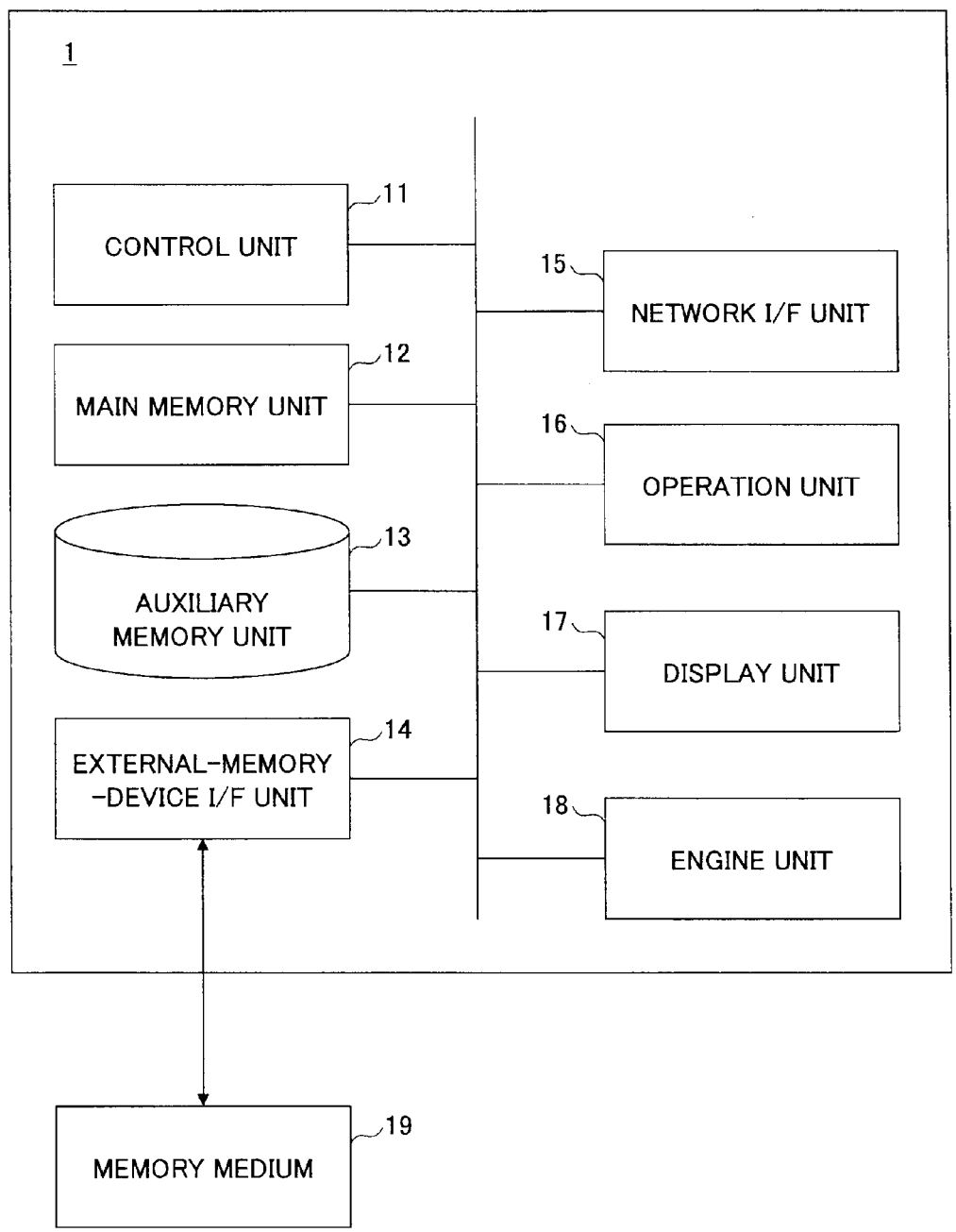
FIG. 1 is a block diagram illustrating an example of the hardware configuration of an MFP according to a first embodiment.

FIG. 1 is a drawing illustrating an example of the hardware configuration of an MFP (multi-functional peripheral) according to a first embodiment. As illustrated in FIG. 1, the MFP 1 includes a control unit 11, a main memory unit 12, an auxiliary memory unit 13, an external-memory-device I/F unit 14, a network I/F unit 15, an operation unit 16, a display unit 17, and an engine unit 18. These units are connected to one another through a bus to exchange data.

The control unit 11 is a CPU that controls each unit and performs data computation and processing in a computer. The control unit 11 is also a computation unit for executing programs stored in the main memory unit 12 or in the auxiliary memory unit 13. The computation unit receives data from an input unit or memory unit, and performs computation and data processing to output the results to an output unit or memory unit.

The main memory unit 12 includes a ROM (Read Only Memory) and a RAM (Random Access Memory), which permanently or temporarily store data and programs such as application software and basic OS software executed by the control unit 11.

The auxiliary memory unit 13 may be a HDD (i.e., hard disk drive) that stores data related to application software or the like.

The external-memory-device I/F unit 14 is an interface between the MFP 1 and a memory medium 19 (e.g., flash memory or SD card) connected through a data transmission line such as a USB (Universal Serial Bus).

A predetermined program is stored in the memory medium 19. The program stored in the memory medium 19 is installed to the MFP 1 via the external-memory-device I/F unit 14. The installed program is then ready to be executed by the MFP 1.

The network I/F unit 15 is an interface between the MFP 1 and peripheral devices having a communication function that are connected through a network such as a LAN (Local Area Network) or WAN (Wide Area Network), which is implemented by use of wired and/or wireless data transmission lines.

The operation unit 16 and the display unit 17 may be comprised of an LCD (i.e., liquid crystal display) equipped with key switches (i.e., hard keys) and a touch-panel function (inclusive of Graphical User Interface software keys). The operation unit 16 and the display unit 17 form an input and/or display unit that serves as a UI (i.e., user interface) for utilizing the functions of the MFP 1.

The engine unit 18 serves as an input/output unit for image data, which scans a paper document, and prints to a paper sheet. The engine unit 18 may include a scanner engine.

<Function>

Figure 2:
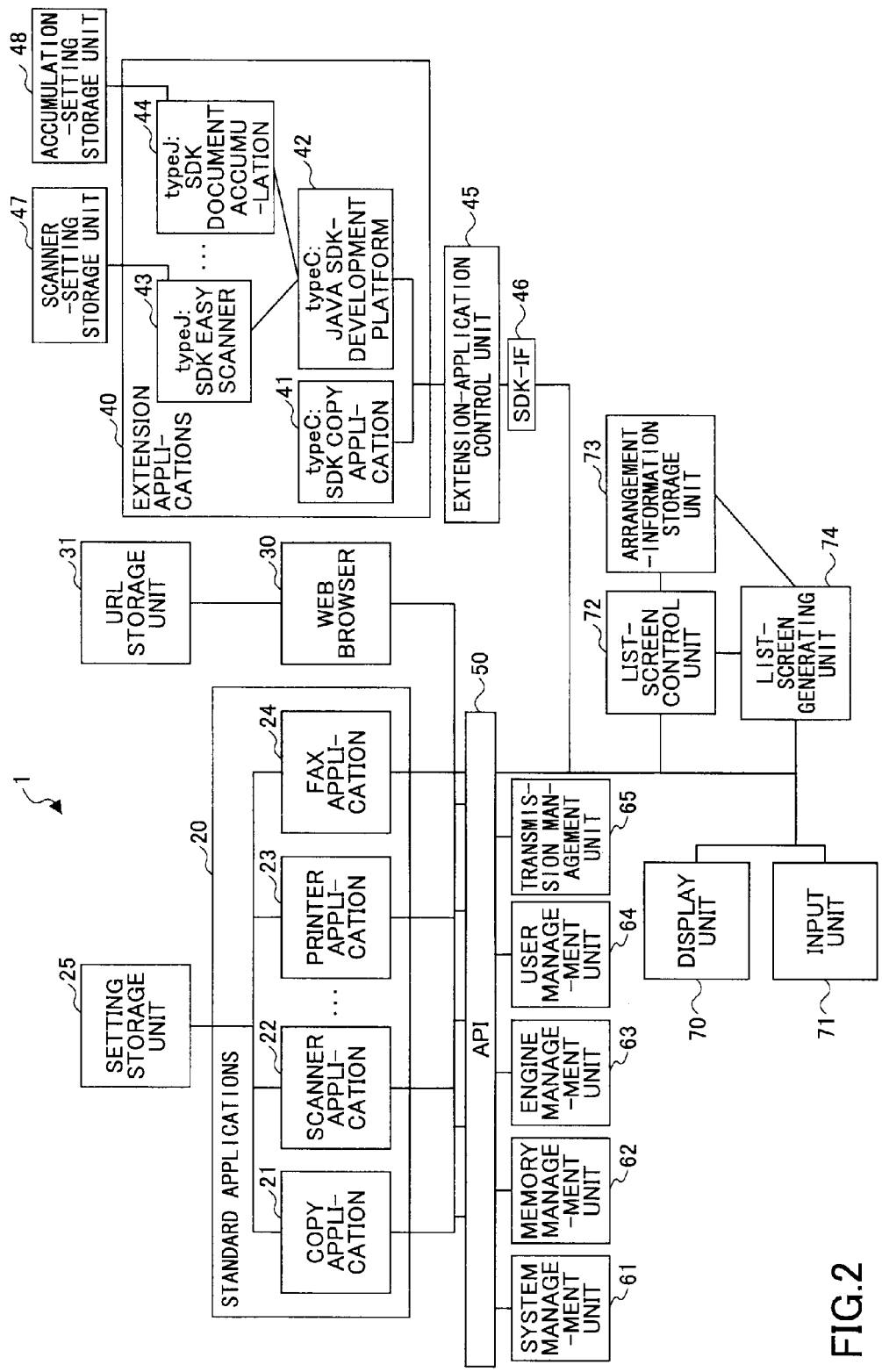
FIG. 2 is a block diagram illustrating an example of the functions of the MFP according to the first embodiment.

In the following, the functionality of the MFP 1 will be described. FIG. 2 is a block diagram illustrating an example of the functional units of the MFP 1 according to the first embodiment. The MFP 1 includes standard applications 20, a setting storage unit 25, a Web browser 30, a URL storage unit 31, extension applications 40, an extension-application control unit 45, an SDK-IF 46, a scanner-setting storage unit 47, and an accumulation-setting storage unit 48. The MFP 1 further includes an API (Application Program Interface) 50, a system management unit 61, a memory management unit 62, an engine management unit 63, a user management unit 64, and a transmission management unit 65. The MFP 1 also includes a display unit 70, an input unit 71, a list-screen control unit 72, an arrangement-information storage unit 73, and a list-screen generating unit 74.

The setting storage unit 25, the URL storage unit 31, the scanner-setting storage unit 47, the accumulation-setting storage unit 48, and the arrangement-information storage unit 73 can be implemented as part of a non-transitory physical memory, e.g., the main memory unit 12, the auxiliary memory unit 13, or the memory medium 12, or combinations thereof.

The standard applications 20 are the applications that are included (i.e., preinstalled) as standard. The standard applications 20 include a copy application 21, a scanner application 22, a printer application 23, and a FAX application 24, for example. The standard applications 20 generate operation screens, and perform application jobs. The standard applications 20 also register and retrieve settings (i.e., setting values or data) to and from the setting storage unit 25. This function of setting registration and retrieval is referred to as a macro function. The standard applications 20 use the API 50 to output data to the display unit 70.

The setting storage unit 25 stores pre-registered settings (i.e., setting values or data) for setting items with respect to each standard application.

The Web browser 30 communicates with an http server to display a Web page. The Web browser 30 receives URL information from the URL storage unit 31, and supplies the Web page of the URL to the display unit 70. The URL storage unit 31 stores URLs to be displayed by the Web browser 30. The Web browser 30 may not be necessarily provided in the first embodiment.

The extension applications 40 are applications that may be additionally installed (i.e., later installed) by use of an SDK (Software Development Kit). The extension applications 40 generate operation screens and perform application jobs. SDK applications developed by use of the C language are classified as type C applications. SDK applications developed by use of Java (registered trademark) are classified as type J applications.

An SDK copy application 41 is one of the SDK applications developed by use of the C language. The SDK copy application 41 is classified as a type-C SDK application (i.e., developed by use of the C language).

A Java SDK-development platform 42 is one of the SDK applications developed by use of the C language. The Java SDK-development platform 42 is classified as a type-C SDK application, and is a Java VM platform for implementing an SDK application developed by use of Java (registered trademark).

An SDK easy scanner 43 is one of the SDK applications developed by use of Java (registered trademark). The SDK easy scanner 43 is classified as a type-J SDK application.

An SDK document accumulation 44 is one of the SDK applications developed by use of Java (registered trademark). The SDK document accumulation 44 is classified as a type-J SDK application developed by use of Java (registered trademark).

The extension-application control unit 45 manages and controls all the SDK applications. The SDK-IF 46 is an interface between the SDK applications (e.g., SDK easy scanner and the like) and various units, such as the management units, the input unit, and the display unit.

The extension-application control unit 45 directly manages and controls the type-C SDK applications. The provision of the Java SDK-development platform 42, which is a type-C SDK application, makes it possible to implement Type-J SDK applications as the extension applications 40.

The scanner-setting storage unit 47 stores settings (i.e., setting values or data) for the setting items of an SDK scanner. The accumulation-setting storage unit 48 stores settings for the setting items of an SDK document accumulation. These storage units serve as storage units to store settings for macro functions of the extension applications 40. It may be noted that a storage unit for storing settings may also be provided for the SDK copy application 41.

The system management unit 61 manages and controls the state of the entire system. The system management unit 61 issues a request to display an operation screen to each application. The memory management unit 62 manages and controls memories, and creates files from scanned data. The engine management unit 63 controls document scan. The user management unit 64 manages and controls user authentication and scanned-data destinations. The transmission management unit 65 controls data transmission from the MFP 1 to other apparatuses.

The display unit 70 displays an application list screen. Further, the display unit 70 displays the operation screens of the standard applications 20 and the extension applications 40 as well as Web pages for the Web browser 30.

The input unit 71 detects the pressing of an icon on the application list screen. The pressing of an icon is detected by the input unit 71 as an operation request directed to the icon. Further, the input unit 71 receives information entered through the operation screens of the standard applications 20 and the extension applications 40 and information entered through Web pages.

The list-screen control unit 72 identifies a screen-display owner among the standard applications 20, the extension applications 40, and the Web browser 30 in accordance with the icon for which an operation request is detected by the input unit 71 on the list screen. The list-screen control unit 72 issues a request to display a screen to the identified owner. The list-screen control unit 72 modifies icon arrangement information in response to editing of the list screen or in response to the state of an extension application 40 (e.g., an installed application being not proper to be displayed). The icon arrangement information will be described later.

The arrangement-information storage unit 73 stores icon images to be displayed on the application list screen as well as the icon arrangement information, which includes the ID of each extension application.

The list-screen generating unit 74 generates an application list screen based on the icon images and icon arrangement information obtained from the arrangement-information storage unit 73.

In a related-art configuration, the extension-application control unit 45 would generate a screen dedicated for extension applications. In the present embodiment, the list-screen control unit 72 controls transition to an application screen based on the list screen that shows all the applications inclusive of the extension applications 40, the standard applications 20, and the Web browser 30.

The standard applications 20, the Web browser 30, the extension applications 40, the management units 61 through 65, the list-screen control unit 72, the list-screen generating unit 74, and the extension-application control unit 45 may be implemented by use of the control unit 11, the main memory unit 12 serving as a work memory, and the auxiliary memory unit 13 storing various programs. The setting storage unit 25, the URL storage unit 31, the scanner-setting storage unit 47, the accumulation-setting storage unit 48, and the arrangement-information storage unit 73 may be implemented by use of the main memory unit 12 and/or the auxiliary memory unit 13. The display unit 70 may be implemented by use of the control unit 11 and the display unit 17. The input unit 71 may be implemented by use of the operation unit 16.

Each of the above-described units can be implemented as a hardware apparatus, such as a special-purpose circuit or device, or as a hardware/software combination, such as a processor executing a software program.

<Data Structures>

In the following, a data structure of data stored in each memory unit will be described. The arrangement-information storage unit 73 stores icon image information and icon arrangement information. FIG. 3 is a drawing illustrating an example of icon image information.

In the icon image information illustrated in FIG. 3, each icon ID is associated with icon image information. The icon image information may be an image registered in advance or an image that is later added. When icon image information is added, an icon ID is automatically assigned to the added icon image information by the list-screen control unit 72, for example.

FIG. 4 is a drawing illustrating an example of icon arrangement information. The icon arrangement information illustrated in FIG. 4 has a data structure in which each icon arrangement ID is associated with coordinates in a list screen, an icon ID assigned to an icon image, and a display screen owner ID for identifying the owner that displays an application screen or the like. One entry (i.e., data in one row) in the icon arrangement information illustrated in FIG. 4 corresponds to one icon to be displayed. Further, the icon arrangement information may include a setting number assigned to application settings provided for a standard application 20 or for an extension application 40, and may include a URL number provided for a Web browser 30.

When an extension application 40 is newly installed, the list-screen control unit 72 assigns an arrangement ID that is obtained by adding one to the highest numbered existing arrangement ID. Further, predetermined coordinates that are available (i.e., not currently used) are added to the icon arrangement information. A screen display owner ID that is inherently owned by the new extension application 40 is also added to the icon arrangement information.

A new extension application 40 may have an icon image. In such a case, the number next following the highest numbered existing icon ID is allocated as an icon ID and added to the icon arrangement information. The icon image information is also updated accordingly. If the new extension application 40 does not have an icon image, a system-default icon ID is assigned.

As illustrated in FIG. 4, icons indicative of the standard applications 20 and the extension applications 40 will be displayed in the same list screen. For example, the printer application 23 that has the arrangement ID "3" as one of the standard applications 20 will be displayed in the same list screen as the SDK copy application 41 that has the arrangement ID "5" as one of the extension applications 40. Further, different entries in the icon arrangement information that are for the same copy application 21, but have different macro function settings, will be displayed as separate icons. For example, the copy application 21 having the arrangement ID "7" and the copy application 21 having the arrangement ID "8" will be displayed as separate icons. By the same token, the extension application having the arrangement ID "4" and the extension application having the arrangement ID "5" will be displayed as separate icons.

In the following, a description will be given of macro-function settings stored in the setting storage unit 25 for the standard applications 20. FIG. 5 is a drawing illustrating an example of settings for the copy application 21.

As illustrated in FIG. 5, setting information includes a registration name and settings (i.e., setting values or data) registered in advance by a user with respect to each setting number. One entry (i.e., data in one row) in the setting information illustrated in FIG. 5 corresponds to one macro function. A setting number may be associated with an entry in the icon arrangement information for the list screen (see FIG. 4).

The macro function to which the setting number "1" is assigned, for example, has the registration name "combined printing", the color setting "full color", the paper-feed-tray setting "A4 landscape", the document type setting "photograph", the set direction setting "readable direction", the density setting "normal", the duplex/combine/series setting "combined", the reduce/enlarge setting "71%", and the finishing setting "sort".

In the following, a description will be given of URL information stored in the URL storage unit 31. FIG. 6 is a drawing illustrating an example of URL information. As illustrated in FIG. 6, a registration name and a URL are registered in advance by a user with respect to each URL number. A URL number may be associated with an entry in the icon arrangement information for the list screen (see FIG. 4).

For example, the URL number "1" is associated with the registration name "AAA homepage" and the URL "www.AAA.co.jp/".

<Screen Example>

Figure 7:
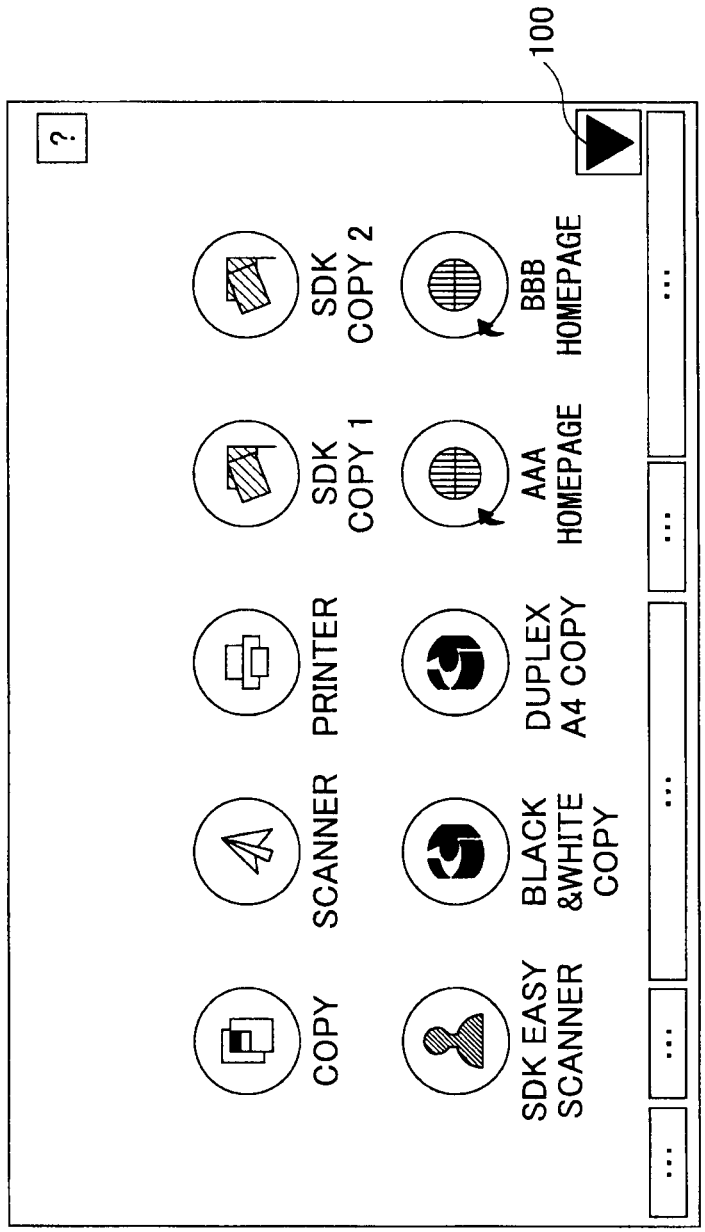
FIG. 7 is a drawing illustrating an example of an application list screen.

In the following, screens and screen transitions will be described. FIG. 7 is a drawing illustrating an example of the application list screen. This example of the application list screen corresponds to the icon arrangement information illustrated in FIG. 4. As illustrated in FIG. 7, what are arranged in one list screen includes short-cut icons for standard applications (copy, scanner, printer), extension applications (type-C SDK copy 1, type-C SDK copy 2, type-J SDK easy scanner), macro-function-set standard applications (black-and-white copying, A4-duplex copying), and Web browser URLs (AAA homepage, BBB homepage).

When an icon in the screen illustrated in FIG. 7 is pressed, a corresponding application screen, Web page, or application screen with registered settings will be displayed. If all the icons do not appear in one screen, a page-forward button 100 at the bottom right corner may be pressed to move to the next page.

Figure 8:
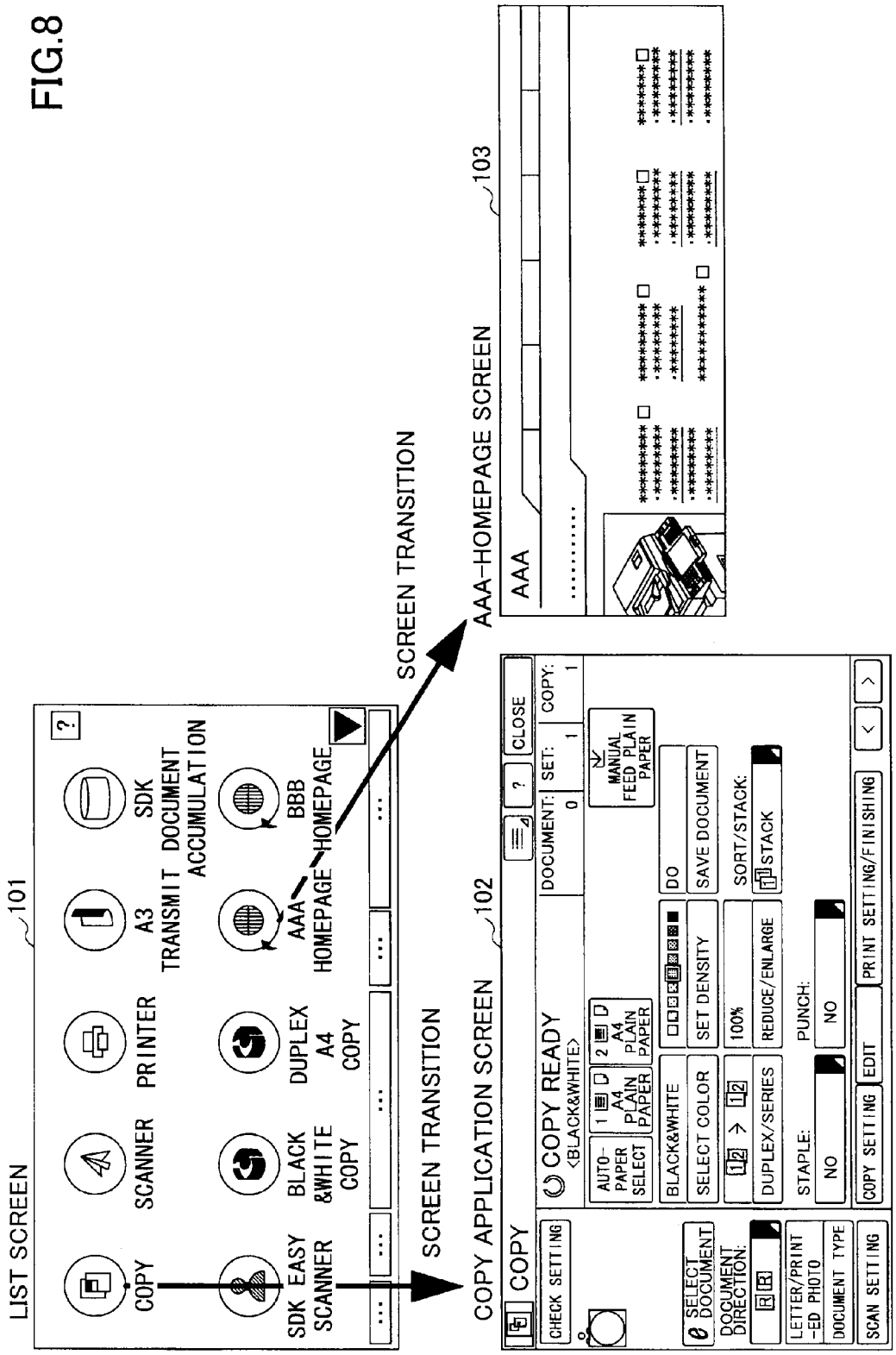
FIG. 8 is a drawing illustrating an example of screen transition.

In the following, examples of screen transitions from the list screen will be described. FIG. 8 is a drawing illustrating an example of screen transition. As illustrated in FIG. 8, the pressing of a copy icon at the top left corner on a list screen 101 causes a copy application screen 102 to be displayed. Alternatively, the pressing of an AAA-homepage icon on the list screen 101 causes an AAA-homepage screen 103 to be displayed. In this manner, one action (i.e., pressing an icon) on the application list screen can cause a screen of a desired function to be displayed, thereby reducing the user's manual labor.

Control of screen transition is performed by the list-screen control unit 72. The list screen 101 may be set as a home screen.

Figure 9:
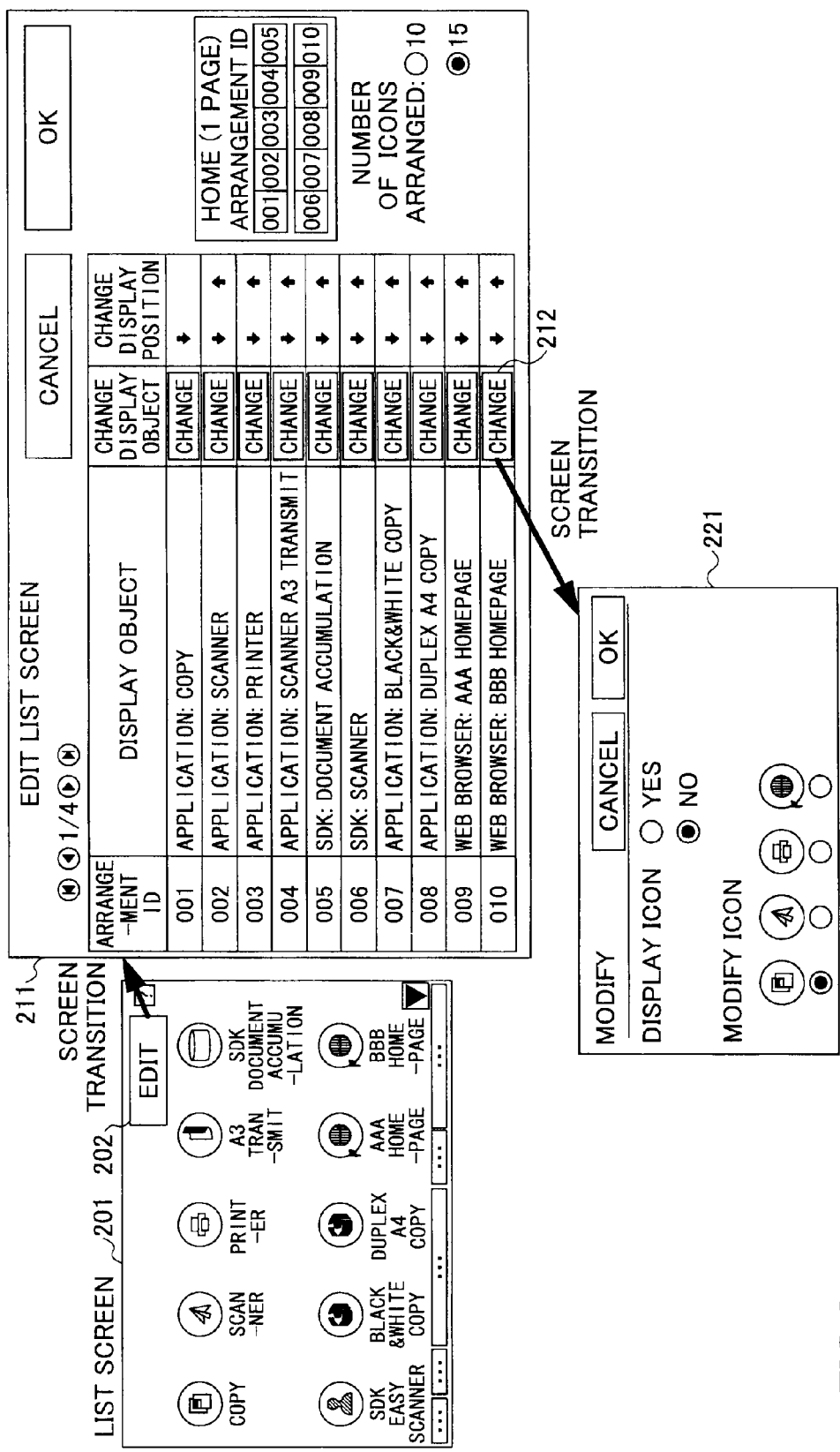
FIG. 9 is a drawing illustrating an example of screen transitions at the time of editing.

In the following, screen transitions at the time of editing a list screen will be described. FIG. 9 is a drawing illustrating an example of screen transitions at the time of editing.

An edit button 202 in a list screen 201 may be pressed in FIG. 9. In response, an edit screen 211 for editing the list screen is displayed. In the edit screen 211, the types and arrangement of the icons and the number of icons displayed in the list screen 201 may be changed.

For example, a modify or change button 212 may be pressed to display a modify screen 221. In the modify screen 221, a display or non-display state may be selected for the icon, and an icon type may be changed.

Namely, the edit screen 211 provides a button for modifying what is displayed for each arrangement ID, thereby allowing an icon to be added or removed and also allowing an icon design to be changed. Further, arrow keys for changing display positions may be operated to change the order in which the icons are arranged on the screen. Moreover, the number of arranged icons may be selected at the bottom right corner to change the maximum number of icons arranged on the home screen.

To reflect a change, the list-screen control unit 72 may make new settings to an icon ID, a display screen owner, a setting number, and/or a URL number for the arrangement ID of interest in the icon arrangement information stored in the arrangement-information storage unit 73. The edit screen and the modify screen displayed upon pressing a modify button may be generated by the list-screen generating unit 74. The arrangement-information storage unit 73 stores layout information, images, and data indicative of coordinates for different numbers of icons that are necessary for the generation of these screens.

Figure 10:
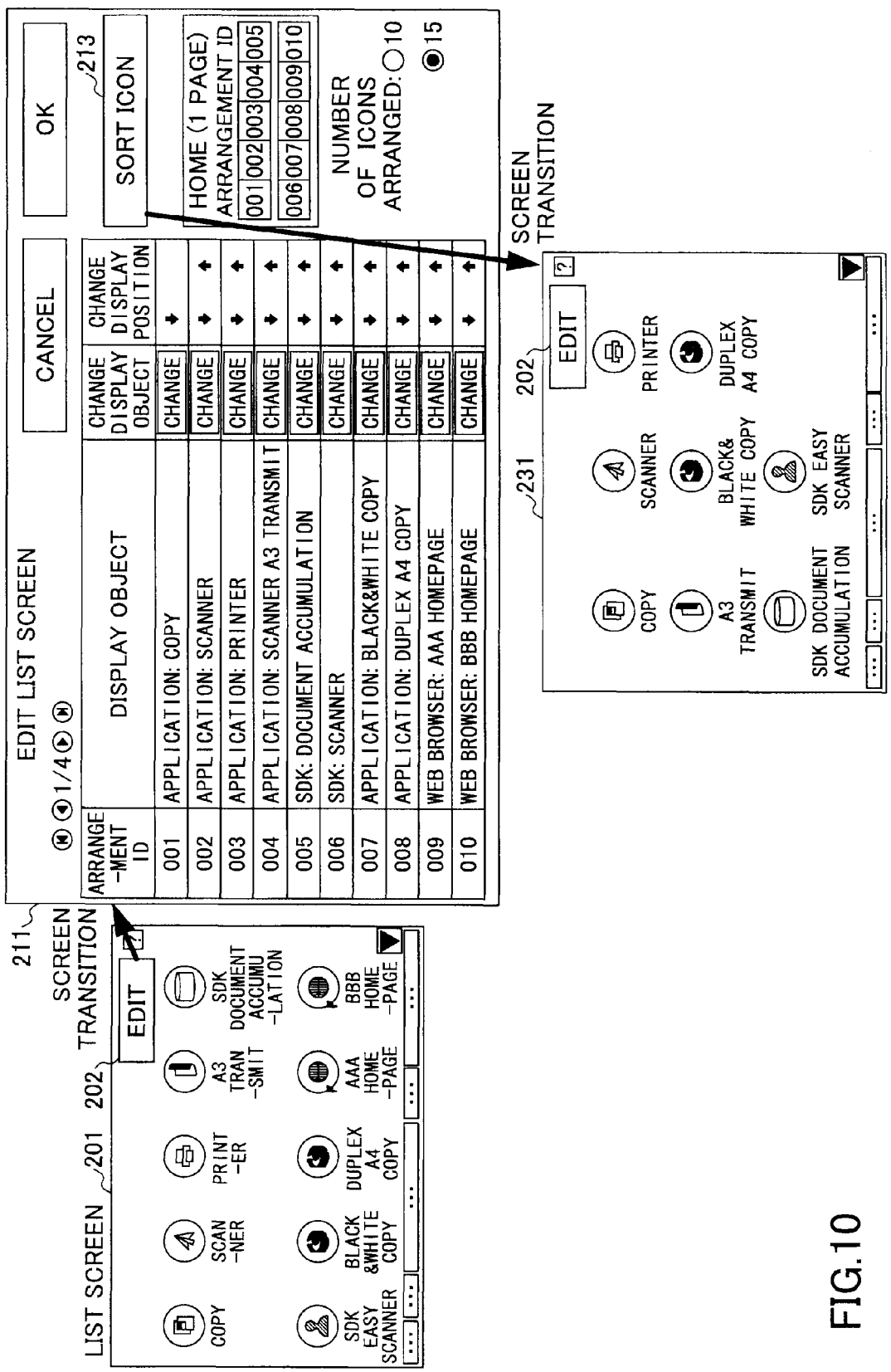
FIG. 10 is a drawing illustrating another example of screen transitions at the time of editing.

In the following, another example of screen transitions will be described. FIG. 10 is a drawing illustrating an example of screen transitions at the time of editing. The pressing of an icon sort button 213 in the list screen 211 illustrated in FIG. 10 causes a list screen 231 to be displayed. In the list screen 231, icons for the standard applications 20, icons for the extension applications 40, icons for the macro functions, and the URL icons are arranged in respective rows. The copy icon, scan icon, and printer icon for the standard applications 20, for example, are displayed on the top row. The macro-function icons are displayed on the second row. With this arrangement, a user can readily understand that each row is assigned to a different application type.

Further, different application types may be shown in respective, different colors to highlight the differences, in addition to or in place of the use of different rows for different application types.

Figure 11A:
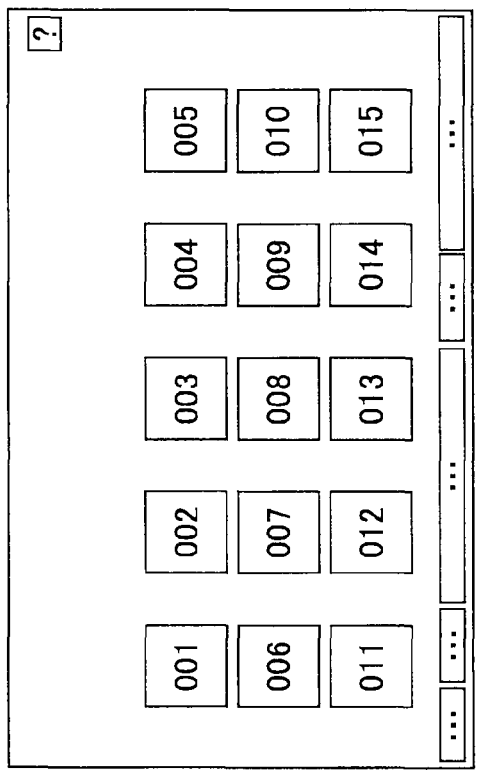
FIGS. 11A and 11B are drawings illustrating examples of icon arrangement.
Figure 11B:
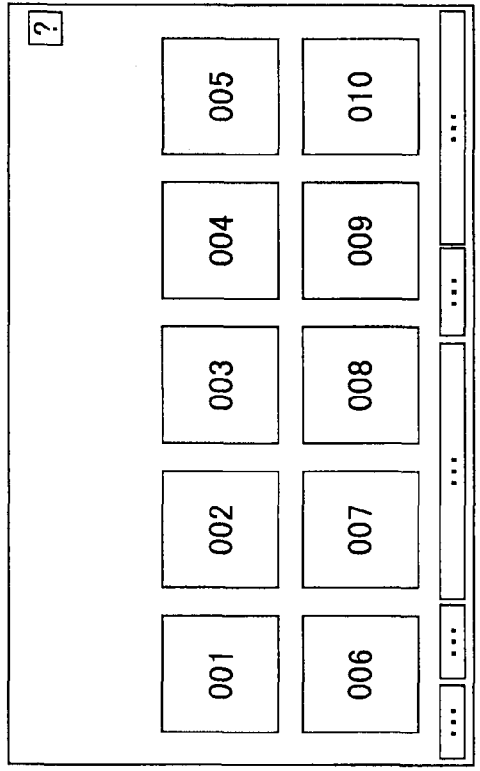

In the following, icon arrangement will be described. FIGS. 11A and 11B are drawings illustrating examples of icon arrangement. FIG. 11A illustrates an example of arranging 10 icons. FIG. 11B illustrates an example of arranging 15 icons. Icon arrangement may be selected from the 10-icon pattern and the 15-icon pattern as illustrated in FIGS. 11A and 11B. Examples of icon arrangement are not limited to those illustrated in FIGS. 11A and 11B.

FIGS. 12A and 12B are drawings illustrating examples of icon coordinate information. FIG. 12A illustrates an example of coordinates of 10 icons. FIG. 12B illustrates an example of coordinates of 15 icons. Icon coordinate information illustrated in FIGS. 12A and 12B is stored in the arrangement-information storage unit 73. Based on the icon coordinate information, the list-screen control unit 72 makes settings to the icon arrangement information, thereby determining or modifying an icon arrangement pattern appearing in the list screen.

<Operation>

Figure 13:
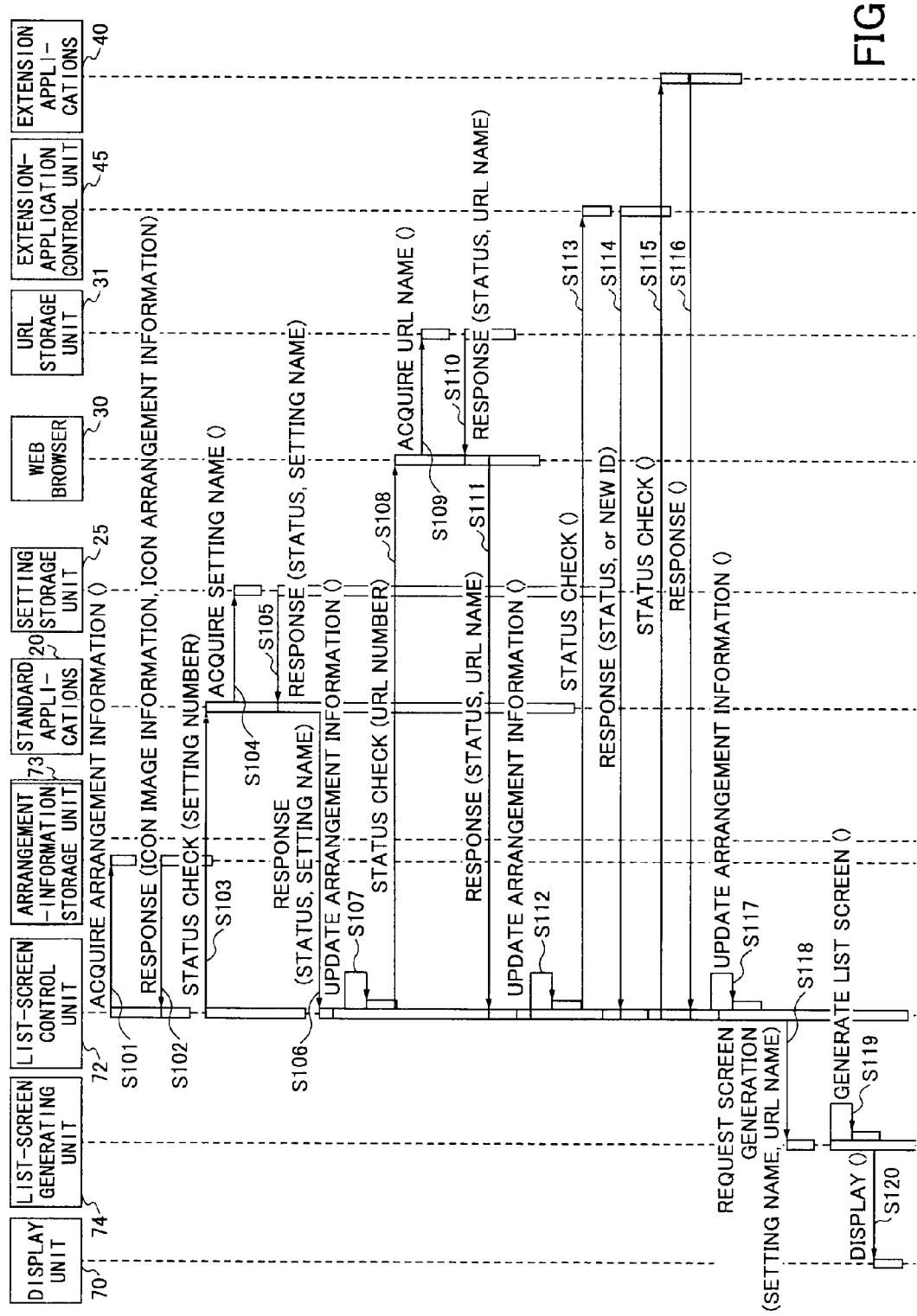
FIG. 13 is a drawing illustrating an example of the procedure of displaying a list screen.

In the following, a description will be given of the operation of the MFP 1 according to the first embodiment. FIG. 13 is a drawing illustrating an example of the procedure of displaying a list screen.

<<Acquisition of Arrangement Information>>

In steps S101 and S102 illustrated in FIG. 13, upon activation of the MFP 1 or upon a request from the input unit 71 to display a list screen, the list-screen control unit 72 acquires icon arrangement information and icon image information from the arrangement-information storage unit 73. In step S103 and subsequent steps, the list-screen control unit 72 performs a status check on an arrangement-ID-specific basis or on an application-function-specific basis with respect to each owner module listed in the icon arrangement information.

<<Check with Standard Application>>

In step S103, the list-screen control unit 72 issues a status check request to the standard applications 20 by use of a setting number as a parameter.

In steps S104 and S105, the standard applications 20 attempt to obtain a registration name (i.e., a setting name) by use of the setting number as a key from the setting storage unit 25 storing the setting information. Upon detecting that the setting number used as a key is not present in the setting information, the standard applications 20 determine that the corresponding macro function is not available. Upon acquiring a registration name corresponding to the setting number used as a key, the extension applications 40 determine that the corresponding macro function is available.

In step S106, the list-screen control unit 72 acquires from the standard applications 20 the registration name (if obtained) and information indicative of whether settings are available for the setting number used as a key.

In step S107, the list-screen control unit 72 updates the icon arrangement information based on the acquired information. For example, when the setting number used as a key is not in existence in the setting information, the list-screen control unit 72 removes a whole entry having this setting number from the icon arrangement information. Namely, the setting number used as a key and the corresponding setting data entry may have been removed from the setting information. In such a case, a whole entry having this setting number is also removed from the icon arrangement information. The icon arrangement information is not updated if all the setting information belonging to the setting numbers used as a key are available.

<<Check with Web Browser>>

In step S108, the list-screen control unit 72 issues a status check request to the Web browser 30 by use of a URL number as a parameter.

In steps S109 and S110, the Web browser 30 attempts to obtain a registration name (i.e., a URL name) from the URL storage unit 31 by use of the URL number included in the status check request. If the requested URL number is not in existence in the URL storage unit 31, the Web browser 30 determines that a corresponding URL is not available. If a registration name belonging to the requested URL number is obtained, the Web browser 30 determines that a corresponding URL is available.

In step S111, the list-screen control unit 72 acquires from the Web browser 30 the URL registration name (if obtained) and information indicative of whether a corresponding URL is available.

In step S112, the list-screen control unit 72 updates the icon arrangement information based on the acquired information. For example, when a URL is not available, the list-screen control unit 72 removes a whole entry having the corresponding URL number from the icon arrangement information.

<<Check with Extension Application)>>

In step S113, the list-screen control unit 72 checks with the extension-application control unit 45 about the installment status of the extension applications 40.

In step S114, the list-screen control unit 72 acquires a screen display owner ID belonging to a new extension application 40 if the extension application 40 has been newly installed, and then adds the acquired owner ID to the icon arrangement information. The extension application 40 may have an icon image. In such a case, the list-screen control unit 72 acquires the icon image through the extension-application control unit 45 to newly add the acquired icon image to the icon image information.

In steps S115 and S116, the list-screen control unit 72 issues a status check request to the extension applications 40 to obtain information indicative of the availability of the extension applications 40. For an extension application 40 that has been uninstalled, the information indicative of availability indicates unavailability.

In step S117, the list-screen control unit 72 updates the icon arrangement information. For an unavailable extension application 40, a whole entry regarding this extension application 40 is removed from the icon arrangement information. For a newly installed extension application 40, an entry regarding the extension application 40 is added to the icon arrangement information.

Depending on the type of an application, a newly installed extension application may be determined as an application that does not need to be displayed as an icon. In such a case, an entry of the extension application may not be added to the icon arrangement information. For example, an extension application that does not relate to a new function, but relates to a system internal process or an updating program, may not need to be added to the icon arrangement information.

<<Generation of Home Screen>>

In step S118, the list-screen control unit 72 issues a request to generate a screen to the list-screen generating unit 74. In so doing, the list-screen control unit 72 arranges that an acquired setting registration name or an acquired URL registration name will be placed under the corresponding icon on the list screen.

In step S119, the list-screen generating unit 74 generates a list screen based on the icon arrangement information and the acquired information.

In step S120, the list-screen generating unit 74 outputs the generated list screen to the display unit 70. The display unit 70 displays the list screen.

A setting registration name and a URL registration name may change from time to time depending on the status of registration in each memory unit. Because of this, the list-screen control unit 72 acquires a registration name when displaying a setting registration name or a URL registration name. In the case of the names of standard applications (i.e., copy, scanner, printer, and FAX) and the names of extension applications (e.g., SDK copy, SDK easy scanner), on the other hand, names are determined in advance.

In the example illustrated in FIG. 13, a check is made with the extension applications 40 each time a list screen is displayed. Alternatively, the extension-application control unit 45 may detect a new extension application 40 when such an extension application 40 is newly installed. Upon the detection, the extension-application control unit 45 may supply information about the new extension application to the list-screen control unit 72. With this arrangement, a status check of the extension applications 40 does not have to be made each time a list screen is to be generated. It may be noted that default icon image information and default icon arrangement information are provided in the system at the time of shipment from the factory.

Figure 14:
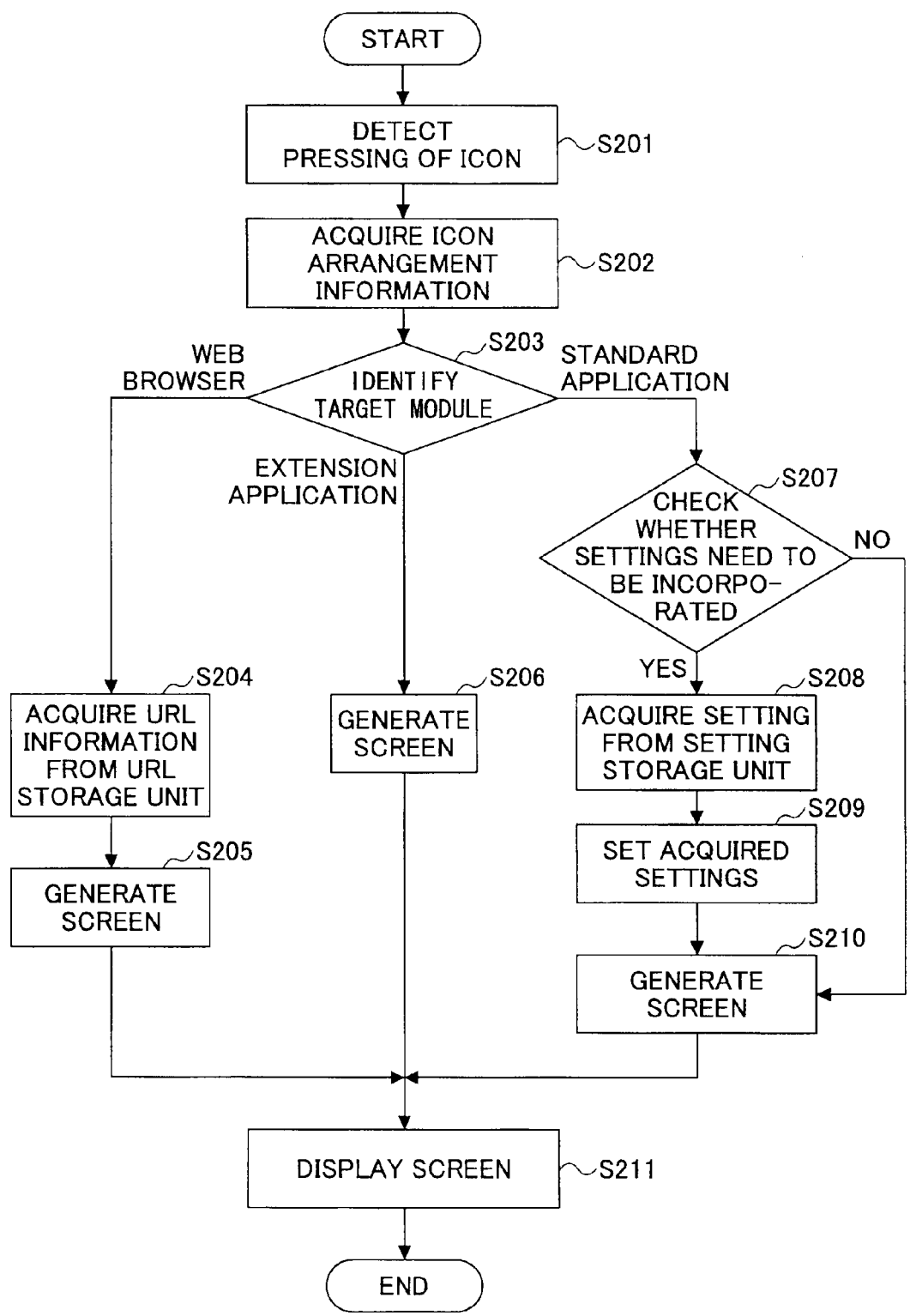
FIG. 14 is a flowchart illustrating an example of a procedure after the displaying of a list screen.

In the following, a procedure after the displaying of a list screen will be described. FIG. 14 is a flowchart illustrating an example of a procedure after the displaying of a list screen.

In step S201, the input unit 71 detects the pressing of an icon in the list screen, and supplies information (e.g., coordinates) about the pressed icon to the list-screen control unit 72.

In step S202, the list-screen control unit 72 acquires icon arrangement information from the arrangement-information storage unit 73.

In step S203, the list-screen control unit 72 identifies the pressed icon based on the coordinate information included in the supplied information, and determines a display screen owner ID of the pressed icon to identify a target module. Based on the determination made in step S203, the list-screen control unit 72 issues a request to generate a screen to the identified target module. In so doing, the list-screen control unit 72 supplies a setting number or URL number, if any, to the target module as a parameter.

If the determination made in step S203 indicates a Web browser, the procedure proceeds to step S204. If the determination made in step S203 indicates an extension application, the procedure proceeds to step S206. If the determination made in step S203 indicates a standard application, the procedure proceeds to step S207.

In step S204, the Web browser 30 acquires URL information from the URL storage unit 31.

In step S205, the Web browser 30 uses the acquired URL information to generate a Web page that belongs to the URL corresponding to the URL number acquired from the list-screen control unit 72.

In step S206, the extension application 40 generates an operation screen.

In step S207, the standard application 20 checks whether the information received from the list-screen control unit 72 includes a setting number. If the check in step S207 indicates the presence of a setting number, the procedure proceeds to step S208. If the check in step S207 indicates the absence of a setting number, the procedure proceeds to step S210.

In step S208, the standard application 20 acquires corresponding settings (i.e., setting values or data) from the setting storage unit 25.

In step S209, the standard application 20 sets the acquired settings for respective setting items.

In step S210, the standard application 20 generates an operation screen.

In step S211, the display unit 70 displays the screen upon receiving data of the screen from the target module.

According to the first embodiment, user operability is improved with respect to the multifunctional machine with enhanced multi-functionality. Further, the first embodiment allows a transition by one step (i.e., one action) from a list screen to an application operation screen or Web page. In the case of extension applications, further, the list-screen control unit 72 of the present embodiment absorbs data exchanges with the extension applications 40 in advance. This arrangement removes needless screen transitions that would be made in a hierarchical manner, thereby providing an easy screen transition to an extension application operation screen.

[Second Embodiment]

In the following, an MFP according to a second embodiment will be described. The MFP 1 of the second embodiment stores icon arrangement information on a user-specific basis. The hardware configuration of the MFP of the second embodiment may be the same as the hardware configuration used in the first embodiment.

<Function>

Figure 15:
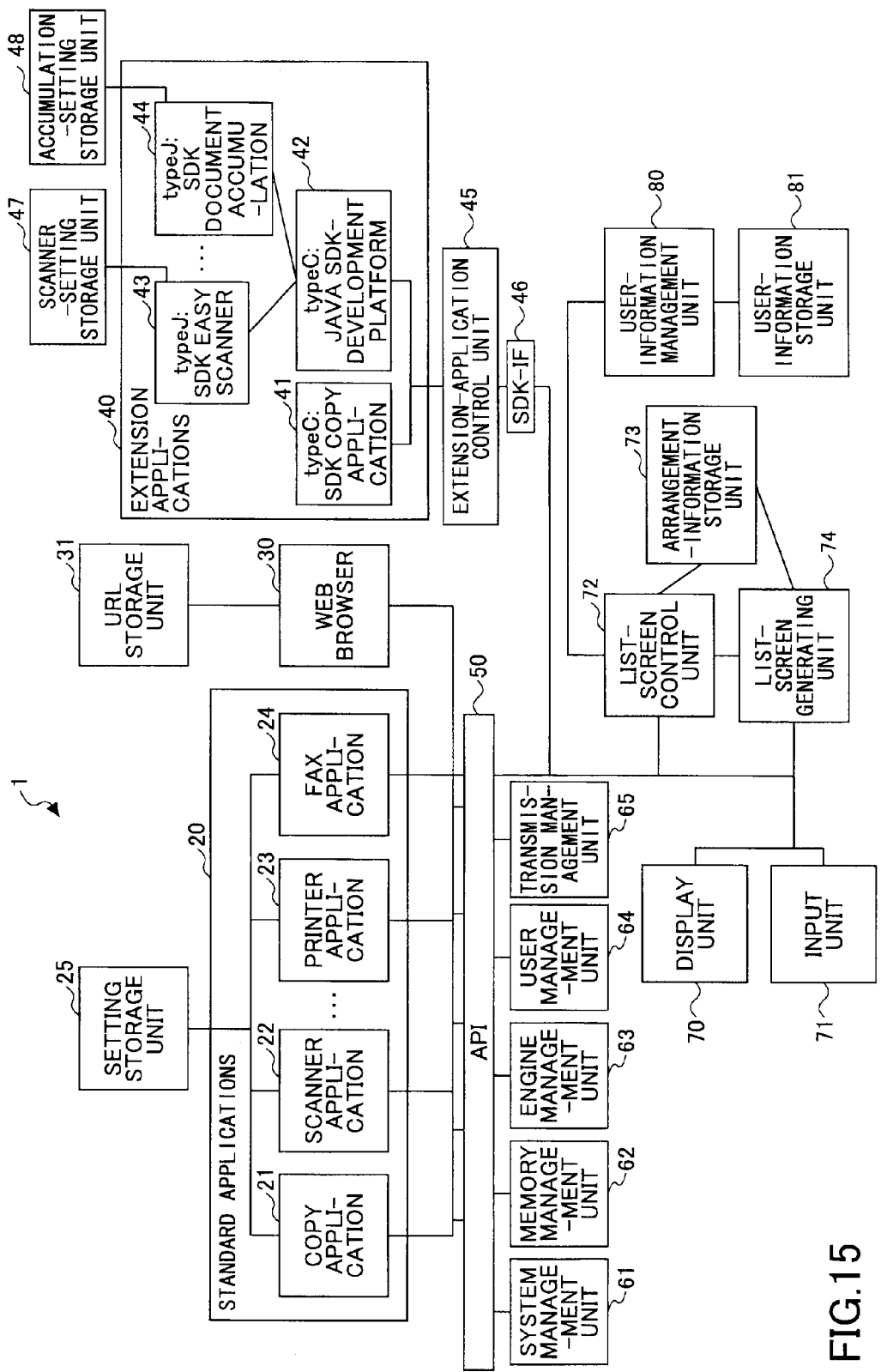
FIG. 15 is a block diagram illustrating an example of the functions of the MFP according to a second embodiment.

FIG. 15 is a block diagram illustrating an example of the functions of the MFP according to the second embodiment. With respect to the functions illustrated in FIG. 15, the same or similar functions as those of FIG. 2 are referred to by the same numerals, and a description thereof will be omitted. In the following, functions that differ from the first embodiment will be described.

A user-information management unit 80 illustrated in FIG. 15 manages and controls information relating to user authentication and information about list screens that are stored on a user-specific basis. When the list-screen control unit 72 issues a request to provide an icon arrangement information ID (also referred to as a table ID), the user-information management unit 80 refers to a user-information storage unit 81 to acquire an icon arrangement information ID belonging to the login user.

The user-information storage unit 81 stores therein user screen information in which each icon arrangement information ID is associated with user information.

The arrangement-information storage unit 73 stores pieces of icon arrangement information such that each piece of icon arrangement information is associated with a different icon arrangement information ID.

The list-screen control unit 72 uses information (e.g., user ID) indicative of the authenticated user to request the user-information management unit 80 to provide an icon arrangement information ID belonging to the logged-in user. The list-screen control unit 72 acquires icon arrangement information stored in the arrangement-information storage unit 73 that belongs to the obtained icon arrangement information ID. Subsequent procedures are the same as those of the first embodiment.

<Data Structure>

In the following, user screen information will be described. FIG. 16 is a drawing illustrating an example of user screen information. The user screen information includes icon arrangement information IDs on a user-specific basis. The user screen information has a data structure in which table IDs assigned to respective pieces of icon arrangement information are provided in one-to-one correspondence to respective user IDs. The user-information management unit 80 manages and controls the user screen information.

According to the second embodiment described above, a list screen varies depending on which user has logged into the MFP.

[Variation]

Programs executed by the image forming apparatus of the first and second embodiments are provided as installable or executable files in a computer-readable recording medium such as a CD-ROM, a flexible disk (FD), a CD-R, a DVD (Digital Versatile Disk), or the like.

Further, the programs executed by the image forming apparatus of the first and second embodiments may be stored on a computer connected through a network such as the Internet and downloaded to the image forming apparatus through the network. The programs executed by the image forming apparatus of the first and second embodiments may be provided and/or distributed through a network such as the Internet.

The programs executed by the image forming apparatus of the first and second embodiments may be provided as programs embedded in a ROM or the like.

The programs executed by an image forming apparatus of the first and second embodiments may have a module configuration inclusive of each unit previously described. In an actual hardware configuration, the control unit (e.g., processor) 11 reads programs from the auxiliary memory unit 13, and executes the programs to load one or more units previously described to the main memory unit 12, thereby implementing the one or more units in the main memory unit 12.

The present inventions are not limited to the above-described embodiments, and elements may be modified without departing from the spirit of the inventions to be put into practice. Elements disclosed in these embodiments may be combined to form various aspects of the inventions. Some elements may be removed from the elements disclosed in these embodiments. Elements may be combined across different embodiments as appropriate.

The invention claimed is:

1. An image forming apparatus, comprising:
   an arrangement information memory configured to store icon arrangement information in which entries respectively corresponding to one or more pre-stored standard applications and one or more additionally installed extension applications are provided, and in which application identification information identifying an application in each entry is associated with information about icon coordinates and information about an icon image, wherein a plurality of the entries in the icon arrangement information are associated with a same application;
   a setting memory configured to store setting information in which plural entries are provided, and in which setting identification information in each entry is associated with settings for setting items of a standard application, wherein the arrangement information memory is configured to store the icon arrangement information in which at least two entries thereof are associated with the setting identification information, respectively;
   a list-screen generating unit configured to generate, based on the icon arrangement information, an application list screen in which icons corresponding to the one or more standard applications and the one or more extension applications are displayed, wherein the list-screen generating unit is configured to generate the application list screen based on the icon arrangement information, such that separate icons are displayed for different entries in the icon arrangement information, the different entries having a same standard application, but having different setting identification information;
   a display configured to display the generated application list screen;
   an input unit configured to detect pressing of an icon in the displayed application list screen; and
   a screen control unit configured to identify a standard application or an extension application corresponding to the pressed icon based on the icon arrangement information and to request the identified standard application or the identified extension application to generate an operation screen,
   wherein the display is configured to display the operation screen generated in response to the request; and
   the list-screen generating unit is further configured to perform a check as to whether each entry in the icon arrangement information is associated with a setting number, and when an entry is associated with the setting number, the setting number is used as a key to retrieve a setting name from the setting memory, and the retrieved setting name is displayed and associated with an icon on the application list screen, and when the entry is not associated with the setting number, an application name is displayed and associated with the icon.

2. The image forming apparatus as claimed in claim 1, wherein, the screen control unit is configured to send the setting identification information corresponding to the identified standard application and a request to generate an operation screen to the identified standard application, when the pressed icon corresponds to a standard application, and the identified standard application acquires settings corresponding to the received setting identification information from the setting memory, and generates an operation screen to which the acquired settings are set.

3. The image forming apparatus as claimed in claim 2, wherein the screen control unit is configured to remove an entry corresponding to the given setting identification information from the icon arrangement information when an entry having given setting identification information is removed from the setting information stored in the setting memory.

4. The image forming apparatus as claimed in claim 1, further comprising:
   an extension-application setting memory configured to store extension-application setting information in which plural entries are provided, and extension-application setting identification information in each entry is associated with settings for setting items of an extension application,
   wherein the arrangement information memory is configured to store the icon arrangement information in which at least two entries thereof are associated with extension-application setting identification information, respectively; and
   the list-screen generating unit is configured to generate the application list screen based on the icon arrangement information, such that separate icons are displayed for different entries in the icon arrangement information, the different entries having a same extension application, but having different extension-application setting identification information.

5. The image forming apparatus as claimed in claim 1, wherein the screen control unit is configured to acquire application identification information and information about an icon image for a newly installed extension application, to assign available icon coordinates to the newly installed extension application, and to add the application identification information, icon coordinates, and information about an icon image of the newly installed extension application to the icon arrangement information.

6. The image forming apparatus as claimed in claim 5, wherein the screen control unit is configured to remove an entry corresponding to the uninstalled extension application from the icon arrangement information when one of the extension applications is uninstalled.

7. The image forming apparatus as claimed in claim 5, wherein the screen control unit is configured to not add an entry corresponding to the newly installed extension application to the icon arrangement information when the newly installed extension application is determined to be an application for which an icon does not need to be displayed.

8. The image forming apparatus as claimed in claim 1, wherein the arrangement information memory is configured to store image data of an edit screen for editing icons in the application list screen; and the screen control unit is configured to incorporate, into the icon arrangement information, information regarding editing of one or more icons edited on the edit screen.

9. The image forming apparatus as claimed in claim 8, wherein the edit screen includes an icon sorting button, and the screen control unit is configured to modify, upon detecting pressing of the icon sorting button, the information about icon coordinates in the icon arrangement information such that displayed icons of the standard applications are readily discriminated from displayed icons of the extension applications.

10. The image forming apparatus as claimed in claim 1, further comprising:

a user information memory configured to store arrangement identification information for identifying the icon arrangement information on a user-specific basis, wherein the list-screen generating unit is configured to acquire the arrangement identification information corresponding to an authenticated user from the user information memory, and to generate the application list screen based on the icon arrangement information identified by the acquired arrangement identification information.

11. The image forming apparatus as claimed in claim 1, further comprising:

a URL memory configured to store one or more URLs to be displayed by a Web browser, wherein the arrangement information memory is configured to store the icon arrangement information in which URL identification information for identifying a URL is associated with information about icon coordinates and information about an icon image; and the list-screen generating unit is configured to generate, based on the icon arrangement information, an application list screen in which icons corresponding to the one or more standard applications, the one or more extension applications, and one or more URLs are displayed.

12. A method of controlling screens in an image forming apparatus in which one or more pre-stored standard applications are provided, and in which one or more extension applications are additionally installable, the method comprising:

storing setting information in which plural entries are provided, and in which setting identification information in each entry is associated with settings for setting items of a standard application;

generating an application list screen in which icons corresponding to the one or more standard applications and one or more extension applications are displayed, the application list screen being generated based on icon arrangement information in which application identification information identifying the one or more standard applications and the one or more extension applications is associated with information about icon coordinates and information about icon images, wherein, in the icon arrangement information, at least two or more entries thereof are associated with the setting identification information, respectively, a plurality of the entries in the icon arrangement information are associated with a same application, and the generating step comprises generating application list screen based on the icon arrangement information, such that separate icons are displayed for different entries in the icon arrangement information, the different entries having a same standard application, but having different setting identification information;

displaying the generated application list screen;

detecting pressing of an icon in the displayed application list screen;

identifying a standard application or an extension application corresponding to the pressed icon based on the icon arrangement information to request the identified standard application or the identified extension application to generate an operation screen;

generating the operation screen by use of the identified standard application or the identified extension application; and displaying the generated operation screen, wherein the generating step of generating the application list screen further comprises performing a check as to whether each entry in the icon arrangement information is associated with a setting number, and when an entry is associated with the setting number, the setting number is used as a key to retrieve a setting name from the setting memory, and the retrieved setting name is displayed and associated with an icon on the application list screen, and when the entry is not associated with the setting number, an application name is displayed and associated with the icon.

13. A non-transitory machine-readable recording medium having a program embodied therein for causing a processor to perform a method of controlling screens in an image forming apparatus in which one or more pre-stored standard applications are provided, and in which one or more extension applications are additionally installable, the program causing the processor to perform:

storing setting information in which plural entries are provided, and in which setting identification information in each entry is associated with settings for setting items of a standard application;

generating an application list screen in which icons corresponding to the one or more standard applications and the one or more extension applications are displayed, the application list screen being generated based on icon arrangement information in which application identification information identifying the one or more standard applications and the one or more extension applications is associated with information about icon coordinates and information about icon images, wherein in the icon arrangement information at least two or more entries thereof are associated with the setting identification information, respectively, a plurality of the entries in the icon arrangement information are associated with a same application, and the generating step further comprises generating the application list screen based on the icon arrangement information, such that separate icons are displayed for different entries in the icon arrangement information, the different entries having a same standard application, but having different setting identification information;

displaying the generated application list screen;

detecting pressing of an icon in the displayed application list screen;

identifying a standard application or an extension application corresponding to the pressed icon based on the icon arrangement information to request the identified standard application or the identified extension application to generate an operation screen;

generating the operation screen by use of the identified standard application or identified extension application; and displaying the generated operation screen, wherein the generating step of generating the application list screen further comprises performing a check as to whether each entry in the icon arrangement information is associated with a setting number, and when an entry is associated with the setting number, the setting number is used as a key to retrieve a setting name from the setting memory, and the retrieved setting name is displayed and associated with an icon on the application list screen, and when the entry is not associated with the setting number, an application name is displayed and associated with the icon.

14. An image forming apparatus, comprising:

an arrangement information memory configured to store icon arrangement information in which icon IDs are associated with application IDs, the application IDs respectively identifying one or more pre-stored standard applications and one or more additionally installed extension applications, wherein a plurality of the entries in the icon arrangement information are associated with a same application;

a setting memory configured to store setting information in which plural entries are provided, and in which setting identification information in each entry is associated with settings for setting items of a standard application, wherein the arrangement information memory is configured to store the icon arrangement information in which at least two entries thereof are associated with the setting identification information, respectively;

a list-screen generating unit configured to generate, based on the icon arrangement information, an application list screen in which icons corresponding to the icon IDs are displayed, wherein the list-screen generating unit is configured to generate the application list screen based on the icon arrangement information, such that separate icons are displayed for different entries in the icon arrangement information, the different entries having a same standard application, but having different setting identification information;

a display configured to display the generated application list screen;

an input unit configured to detect pressing of an icon in the displayed application list screen; and a screen control unit configured to identify an application corresponding to the pressed icon based on the icon arrangement information and to request that the display display an operation screen of the identified application, wherein the list-screen generating unit is further configured to perform a check as to whether each entry in the icon arrangement information is associated with a setting number, and when an entry is associated with the setting number, the setting number is used as a key to retrieve a setting name from the setting memory, and the retrieved setting name is displayed and associated with an icon on the application list screen, and when the entry is not associated with the setting number, an application name is displayed and associated with the icon.

* * * * *